Patented Dec. 8, 1936

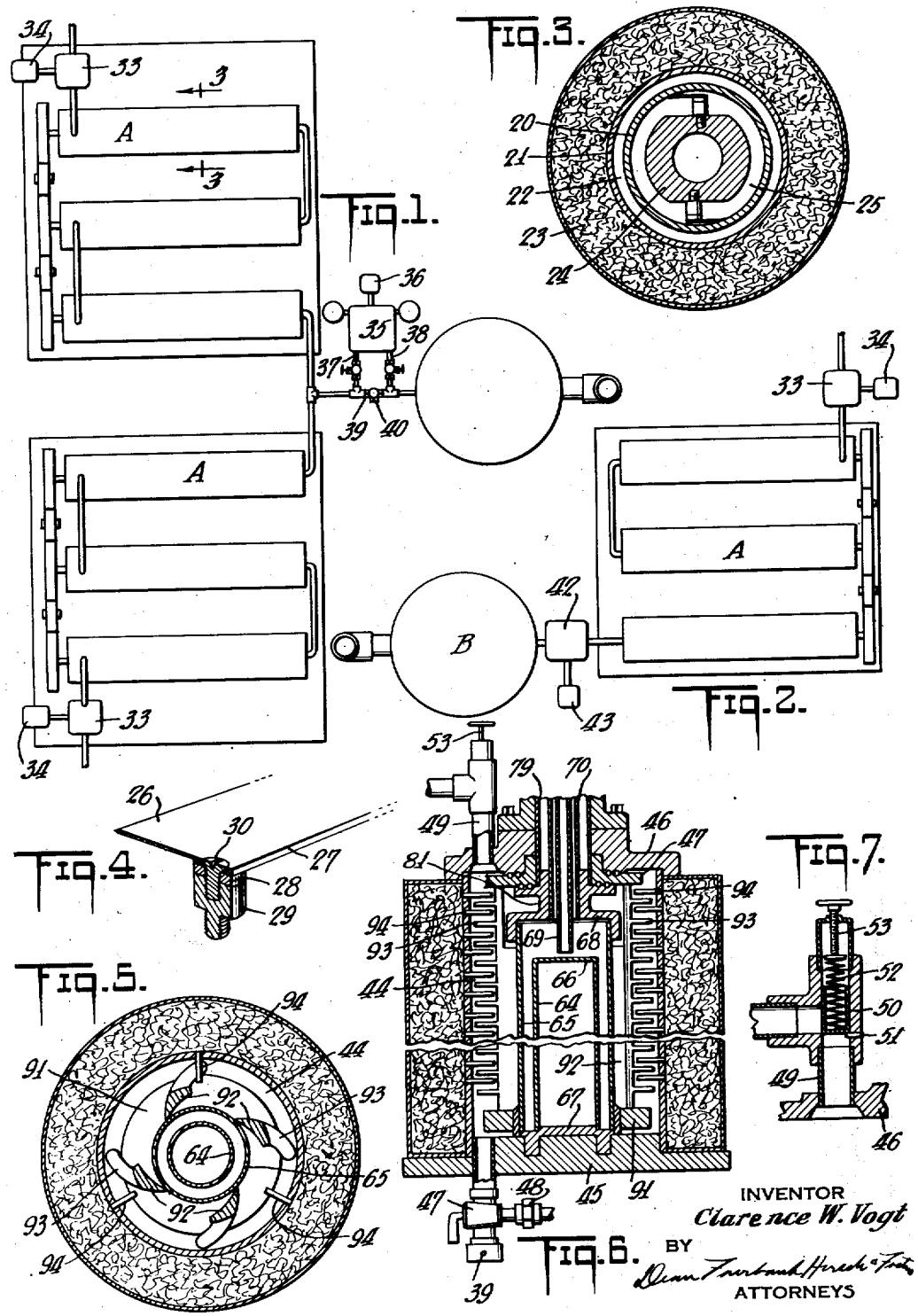

2,063,066

UNITED STATES PATENT OFFICE 2,063,066

METHOD AND APPARATUS FOR PROCESSING MATERIAL

Clarence W. Vogt, Louisville, Ky., assignor, by mesne assignments, to The Girdler Corporation, Louisville, Ky., a corporation of Delaware Application December 13, 1932, Serial No. 646,967

19 Claims. (Cl. 62—114)

This invention relates to methods of processing liquid or semi-liquid materials or mixtures to increase the stiffness of the material, for instance, by causing the crystallization or solidification of a portion of the ingredients.

In this application there is broadly claimed an apparatus and process of the type disclosed and more specifically claimed in application Serial No. 488,808, filed Oct. 15, 1930, by Clarence W. Vogt and William E. Snyder.

It is well known that quickly formed crystals are small. This fact is taken advantage of in the processing of many articles, principally foods in which smoothness is a desirable characteristic and therefore one avoids the formation of crystals of a size which can be detected by sensation set up when said food is "tasted" by a consumer. In the processing of materials such as ice cream, ices, ice cream sherbets, etc., use has been made of agitation during rapid chilling and freezing, in order that any formed crystals would be small because of the rapid chilling and in order that some of the crystals formed would be comminuted due to the agitation during crystal formation. It is obvious that in the solidifying or partially solidifying of a liquid material, the agitation must be reduced in intensity or dispensed with after such material becomes very stiff especially if the material is held in a mass as distinguished from being sprayed and flaked.

Some of the reasons for the reduction or cessation of agitation are:

1. The power required to mull or whip a practically solid material is excessive.

2. This mulling or whipping of very stiff material sets up a large amount of frictional heat in the mass which causes a rise in temperature and a corresponding softening, thus tending to defeat the objective.

3. With materials such as ice cream in which a large percentage of air has been incorporated, excessive mulling or agitation after the material has reached a given degree of stiffness will cause destruction of the confined air cells, therefore damaging the texture of the product.

It is also known that certain materials can be "super-cooled" while the material is still quite fluid. By this is meant cooled below the temperature at which the materials should be in a "set" condition. An example of this condition is found in the processing of animal and vegetable oils. Vegetable oils are usually hydrogenated to such a degree that, after solidification, they will remain substantially solid until the temperature is raised to a point approaching that of the human body. However, in the chilling of these oils where agitation is present during the chilling and where such oils are chilled in an efficient unit similar to those shown in my Patents 1,783,864, 1,783,865 and 1,783,867, dated Dec. 2, 1930, with the temperature of the refrigerant at a point substantially below the temperature of the material under treatment, it is possible to lower the temperature of the material 20° F. to 40° F. below that at which it should be a substantial solid, but because of the rapidity at which the temperature has been lowered together with the effectiveness of the agitation the material is still in a readily flowable state. It has been found under these conditions, however, that as soon as agitation ceases the material will "set" instantly. This "setting" of the material involves the crystallization of a portion of the ingredients. The heat of crystallization, which is given off by this portion, is taken up by the remainder of the material as sensible heat and thus the temperature of the material will be (unless otherwise prevented) appreciably raised during this "setting". This increase in temperature, due to additional crystallization, will hereinafter be referred to as "kick up".

Materials in which an air or gas is incorporated to cause the desirable whiteness and spreading quality in the commercial product known as lard or lard substitutes, and when chilled very rapidly to a degree substantially below a temperature at which it should become substantially solid, and agitated to cause a proper smoothness and uniformity of incorporation of air, exhibit this kick up upon being discharged into a container. This kick up in temperature may cause a loss of some of the air which had been previously incorporated at the lower temperature and produce what is known as a "vaseliney" condition or a translucency as contrasted to the desired whiteness and opaqueness. It has been found that a large percentage of this kick up occurs within the first minute or two after rapid chilling and mechanical agitation ceases.

The usual type of apparatus which has been used for the processing of lard compounds and which has also been used for chilling and setting of margarin emulsions is an internally refrigerated roll upon which the material is permitted to adhere in a very thin layer, and after it has become chilled and set to the desired degree it is scraped from the roll and collected for further processing. Margarin is given a different subsequent series of treatments than lard or vegetable compounds used as lard substitutes. The lard substitutes, after having been removed from the roll, are brought into an open trough known as a picker box in which an agitating mechanism known as a picker is operated. This device whips up the material, incorporating air therewith, after which the material is usually forced through screens or other mechanism for breaking up lumps which have been previously formed in the material. In such a process the kick up is present, although not in as great amount, and in many cases it has been found necessary and desirable for the obtaining of a satisfactory product that the material, after passing through the picker box, be again subjected to refrigeration in a so-called "blender" in order to prevent this kick up from going too far and to prevent the vaseliney spots which are really small masses of the material which do not contain sufficient amount of air to make the material opaque.

It is apparent that with this type of apparatus and with the method just described where a chilling roll, picker box and blender are used, it is impossible to eliminate air from the product, and furthermore a great deal of power is required for operation. While the incorporation of a gas is desirable in order to render the material of a suitable whiteness, an inert and preferably desiccated gas, such as nitrogen, has been found to be very much more desirable than an oxidizing gas or a moist gas, such as air. However, the roll and picker box type of apparatus does not lend itself to operation in an atmosphere of inert gas. It is known that the presence of moisture has a deleterious effect on the keeping quality of lard compounds.

When margarin is chilled on a roll and in a manner hereinbefore described for lard and vegetable compounds, it is permitted to come off the roll in practically solid flakes. These flakes are quite hard due, in part, to the crystallization having occurred in the absence of agitation and also, in part, to the nature of the material. Margarin contains a small percentage of serum solids, and, say, about 15% of water, which are not readily miscible with the oil. This flake-like material is worked by large, cumbersome, slow and inefficient means into a spreadable plastic material resembling butter, but this additional working usually causes a loss of retained water and milk content below the desired percentage. This is partly compensated for by the working in of additional water, this operation being known as standardizing. Providing the margarin is desired to be salted, salt is also worked in on a subsequent operation.

It has been found that when margarin has been chilled in an apparatus similar to that described in the patents above referred to, it has much more nearly the desired smoothness of texture than the flakes produced on the hereinbefore described roll. However, as margarin contains approximately 80% animal or vegetable oil, the kick up hereinbefore mentioned also occurs, but to a somewhat lesser degree due to the greater amount of the water and other ingredients which do not crystallize at the normal temperature at which margarin is processed or stored. The crystals which form during this kick up cause bonding of the material, probably in a stratified form. This is not desirable because it detracts from the spreading qualities and causes a condition which resembles crumbliness.

I have discovered that if the material is quickly chilled in an apparatus similar to that described in said patents, and if upon reaching the desired low temperature (which is usually around 55 to 80° F. in the case of margarin and vegetable compounds hereinbefore mentioned), it is held under less intensive refrigeration for a period of approximately a minute, the kick up and the vaseliney condition hereinbefore mentioned are substantially eliminated. In my improved process the material is brought rapidly to a temperature sufficiently below the desired crystallizing temperature to cause a very rapid formation of the crystals followed by the holding of the material for a longer period under less intensive or effective refrigeration to permit further crystallization to take place under (in some cases, reduced) agitation.

In the cases of margarin, lard and lard substitutes, the temperature of the oil at which it is fed to the chilling apparatus is usually higher than the temperature at which any crystallization takes place. This is usually over 90° F., say from 100° to 120° F. Provided air or an inert gas is to be incorporated with the material to obtain the desired whiteness, as is almost invariably the case with lard and lard substitutes, a greater amount of material can be chilled with a given refrigerating surface provided the gas is not added with the hot oil. If the gas to be added is being drawn from a room, or a gas container held at room temperature of say 70° F., and, if such gas is injected with the hot oil, the gas becomes heated and must be recooled. The presence of the gas reduces the amount of heat transfer which is obtainable where the material is free from such air or gas bubbles.

In the case of a completely enclosed processing apparatus it has been found to be advantageous to add the air or gas (preferably moisture free) after the material has been chilled to the desired temperature, namely, from 55 to 80° F. The air or other gas is readily incorporated with the chilled material by any suitable mixing or agitating or whipping mechanism or even merely by the reduction in the pressure at which the material and gas have been subjected. This rapid reduction in pressure has been found to assist in the satisfactory incorporation of the gas or air in a chilled and rapidly moving liquid or semi-liquid.

In the case of ice cream and similar frozen confections, the product obtainable by the partial freezing of such products, by the use of apparatus, as disclosed in said patents, is distinctly superior, and is of a smoothness heretofore unobtainable by any other type of apparatus. However, the processing of the material in a relatively thin confined layer does not permit of the incorporation in the frozen product of large particles of fruit, etc., while the material is in said confined layer, as it is impossible to pass ½" cubes of fruit through a space, one dimension of which is only $\frac{1}{16}$", without either distorting the fruit or clogging the space. Fruits which are usually added to ice cream products, either in natural unsweetened condition, or with sugar syrup added thereto, have a tendency to raise the temperature of ice cream to which said fruits have been added after the ice cream has been frozen, and it is desirable to prevent, as much as possible, the melting of the partially frozen ice cream by the addition of warmer fruit.

The manufacture of ice cream as now carried out in many of the wholesale ice cream plants calls for an hourly production of several thousand gallons and while it is entirely practicable to build units of this hourly capacity according to the principles of apparatus as disclosed in said patents, the conditions make it desirable that the large plants equip themselves with multiple units.

The principle reason for this is that during the winter months the consumption of ice cream is at lower rates than in the summer months, and therefore it is desirable to have flexibility in hourly capacity. Also ice cream is produced in different flavors, and it is often times desirable to produce several flavors of ice cream during the same shift at the same time. However, it is quite advantageous that the manufacturer produce an ice cream of uniform weight and texture, and with this end in view some of the manufacturers have resorted to the use of so-called hoppers which are usually insulated and/or refrigerated troughs into which the product of one or more freezers is discharged, and these hoppers have been provided with pushers which tend to intermix the material of the several freezers, thereby tending to produce a material of a more nearly uniform or standardized weight and texture.

However, the use of the open type of hopper will not permit of the production of a product which has been prefrozen to as great an extent as has been found desirable and obtainable with the type of apparatus disclosed in said patents. Furthermore, the type of pushing or screwing action to which the partially frozen product is subjected to in the hopper causes a loss of overrun as well as damage to the texture of the product by producing sogginess.

As a solution for the hereinbefore mentioned conditions and problems I have produced a new form of apparatus including a un't which will hereinafter be referred to as a "B" unit or units, operated in conjunction with another unit which may be similar to those disclosed in said previous patents, and hereinafter referred to as an "A" unit or units. In the case of margarin and vegetable oils such an apparatus should have sufficient capacity for retaining the material which had been previously processed in the A unit, said B unit having sufficient refrigeration to absorb additional heat of crystallization, and having a proper type of whipping and working means to prevent the formation of lumps during this period. Between such B unit and the A unit or A units from which same is supplied, means are provided for the incorporation or addition of air or an inert gas where such addition is considered to be desirable.

In the case of ice cream, such a B unit has the advantage of distributing, and at the same time cooling large or small particles of fruit, etc., which have been added to a product which has been previously processed in one or more A units. Such an apparatus has the further advantage of unifying or standardizing the product which has been previously partially frozen in one or more A units, so that the product delivered from the B unit is of a uniform texture. In the apparatus disclosed in said patents a greater degree of uniformity can be obtained than from any apparatus heretofore known in the art, but uniformity is a relative term. As an example, if the material from one A unit is being held between 100 and 105% overrun, and the material from another unit is being held between the same limits, when these two products are passed into a common B unit in which they are further mixed, it will be obvious that the fluctuation of the product coming from the third or B unit will be less than the fluctuation of either of the primary or A units.

In the case of lard or lard substitutes the same advantages apply as in the case of margarin hereinbefore set out except for the fact that the addition of air or other gas has been found essential to obtain the desired opaqueness and as hereinbefore pointed out. The incorporation of relatively cooled gas or air with the chilled product is advantageous over the adding of relatively cool air or gas to the relatively hot oil, thereby permitting the gas to be heated, and therefore requiring the cooling of this gas which is taking up valuable space, and thus reducing the amount of B. t. u.'s absorbed by a given size A unit.

Although the present improved apparatus will be explained only as including or used with apparatus mentioned in the aforesaid patents, this invention is not limited to the use in connection with such apparatus, but it is obvious that while the advantages of such combinations are greater where the first steps are performed in the most efficient manner the invention is not limited to such combinations, but includes all apparatus in which the primary operations may be carried on.

In the accompanying drawing certain embodiments of the invention are shown for purposes of illustration, but the details are not to be considered as any limitations of the scope of the invention.

In the drawing:

Fig. 1 is a diagrammatic representation of a plurality of A units connected for delivery to a single B unit, and particularly adapted for ice cream or the like, Fig. 2 is a diagrammatic illustration of another arrangement of A and B units which may be used for processing margarin, lard or lard substitutes, Fig. 3 is a transverse section through one of the A units, for instance, on the line 3—3 of Fig. 1 and on a very much larger scale, Fig. 4 is a detail partly in section and partly in perspective of a blade employed in the A section shown in Fig. 3, Fig. 5 is a transverse section through the B unit, Fig. 6 is a partial central vertical section of the B unit, and Fig. 7 is a detail of the outlet valve for the processing material.

As previously indicated the A unit may be constructed substantially as shown in any one of my prior patents, and in such unit the material is subjected to the required refrigeration, while advanced as a comparatively thin layer and while beaten, agitated or whipped in said layer.

In Fig. 3 there is illustrated a section through such a unit. The material is caused to flow lengthwise through a tube 20 which is encircled by an outer tube 21 to provide an annular space 22 for the refrigerating medium. This medium may be either brine, ammonia or other fluid and its temperature will be controlled in accordance with the character of the material treated. Outside of the tube 20 is an insulating jacket 23 to prevent heat losses through radiation. Inside of the tube 20 is a shaft 24 of an external diameter nearly as great as the internal diameter of the tube 20 so as to leave a comparatively thin annular space 25 through which the material to be processed is caused to flow. The thickness of this annular space may vary depending upon the character of the material treated, but for ordinary materials, such as ice cream, margarin or the like, the space is preferably not greater than $\tfrac{1}{16}$" in thickness.

The shaft 24 carries one or more whipping, agitating, beating or scraping blades disposed adjacent to the inner surface of the tube 20. The present invention does not reside in the specific character or details of these blades, but an improved form includes a flexible blade 26 formed of thin metal as shown in Fig. 4. The blade is so mounted that one edge lightly presses against the inner surface of the tube 20 and the opposite edge is spaced from the shaft a sufficient distance to permit the material which has been scraped off the refrigerated surface to pass beneath the blade, that is, between the latter and the shaft. The blade at its rear edge is preferably folded back upon itself to form a reinforcement 27, and there are preferably soldered or welded to this rear edge portion a plurality of washers 28 so as to give the blade adequate thickness at the supported point.

The shaft is provided with a plurality of studs 29 which may be threaded into a flattened side of the shaft and screws 30 extend through the blade 26 and washer 28 into said studs. By reason of the washers 28 there is no danger of the screw heads being forced through the thin metal blade, even though the screw heads are countersunk so that the outer surface is flush with the outer surface of the blade.

The single blade 26 may extend the full length of the tube 20 or the blade may be cut into a plurality of sections so that contact with the tube wall is insured along the full length.

Preferably there are employed a plurality of the tubes 20 connected together in series. All of these tubes may be mounted in a single casing and insulating jacket as illustrated in my Patent 1,783,865, but to simplify illustration in the present case, I have shown the tubes mounted side by side with the ends of the shafts 24 connected by a train of gears 31 so that the shafts are simultaneously rotated at the proper desired speeds. The tubes are also shown as connected together in series by conduits 32 which in practice are, of course, insulated to prevent heat losses.

This apparatus in which the material is forced at high speed while being subjected to intense refrigeration and violent agitation, is designated as an A unit irrespective of whether the unit contains a single tube 20 or a series of such tubes, and even though the details of the apparatus vary quite materially from that herein illustrated or illustrated in the aforesaid prior patents.

In Fig. 1 I have shown two such units in parallel connected in series with the B unit. Material is delivered to each unit by a pump 33 which may be driven by a suitable motor 34. The pump is a material admission pump and may serve as a combined liquid and gas pump if air or other gas is to be delivered with the material through the A unit. It may also serve as a mixing and proportioning pump if two or more liquids or other fluids are employed, or if solid material is fed in with the liquid or semi-liquid material. A pump of this general character is illustrated in my Patent 1,902,315, issued March 21, 1933.

The material from one or several A units is delivered to a B unit illustrated diagrammatically in Figs. 1 and 2. Between the A and B units there may be employed a suction pump 35 for drawing the material from the A unit or units and supplying it under pressure to the B unit or for adding a gas or other ingredients, such as fruit or nuts. This pump is preferably of the type illustrated in my Patent 1,902,346, issued March 21, 1933. The pump is operated by a motor 36 and has valve controlled inlet and outlet conduits 37 and 38 connected to a transfer line 39 between A and B units and upon opposite sides of a valve 40. This valve which is not illustrated in detail may be of any suitable type, but is preferably a combined stop and check valve.

In Fig. 2 there is illustrated only one of the A units for delivery to a single B unit.

In the transfer line 39 there is provided a pump 42 driven by a motor 43. This is the preferred arrangement for margarin or lard or lard substitutes in which the air or other gas is added after the material has left the A unit. The pump 42 is of the type previously referred to and serves for the delivery of air or other gas into the material, as well as serving to pump the material from the A unit to the B. It also serves to properly proportion the refrigerated material and the added gas. Various other arrangements of A and B units may be employed. While not shown, it will be readily understood that either of the pumps 35 or 42 may receive its supply of gas from a gas holder held at a uniform pressure or from any suitable source, for instance, if the air is to be added it may be drawn through filtering and dehumidifying units.

One form of secondary or B unit is illustrated in Figs. 5 and 6. The material is delivered from the A unit through the pipe 39 to a processing chamber 44 which may be of such capacity that the flow of material therethrough will take a very much greater time than is required for the flow of the material through an A unit. The chamber is illustrated as a cylindrical drum having heads 45 and 46 with the inlet at one end and the outlet at the other. Preferably the material enters near the bottom of the drum and escapes at the top. The supply line 39 is illustrated as having a three way valve 47 with a drain pipe 48 so that by proper manipulation of this valve the supply may be shut off and the unit drained. The outlet is shown as a pipe 49 leading from the top head 46 and having an adjustable spring pressed valve 50 which will open when the pressure in the unit reaches a predetermined limit and will thus act to maintain the proper pressure in the B unit. The valve is shown as engaging a stop 51 in closed position and having a spring 52, the tension of which may be adjusted by a regulating screw 53 so that the back pressure in the unit may be readily controlled.

The B unit, in the form illustrated, is internally refrigerated, although so far as concerns the broad scope of the invention, the refrigerant may be externally applied as is the case with the specific form of A unit illustrated.

In the form illustrated, within the chamber 44 there is a pair of concentric cylindrical walls 64 and 65 spaced apart to leave an annular vessel for the refrigerating medium. The inner wall 64 is closed at both ends by walls 66 and 67 and may form merely a sealed air chamber or may be filled with insulating material. The wall 67 preferably has pins or other means engaging the bottom 45 to resist all tendency of the refrigerant vessel to rotate. The outer wall 65 at its lower end is also connected to the wall 67, but at its upper end has a separate head or top wall 68. Through this wall extend two concentric pipes 69 and 70, one for the admission and the other for the outflow of the refrigerant. The inner pipe 69 is preferably for the supply.

The refrigerant may be a volatile one, such as ammonia, and the refrigerating space between the walls 64 and 65 may be kept flooded with the refrigerant and the latter evaporated at a rate depending upon the back pressure maintained in the pipe 65 and upon heat transfer from the material in the chamber 44.

If brine be the refrigerant, one of the refrigerant pipes should be extended to the bottom of the refrigerant vessel to insure proper flow in the vessel.

Within the chamber 44 and encircling the refrigerant vessel, there is provided an agitating mechanism which serves to thoroughly mix and homogenize the material being processed. This mechanism also serves to continuously scrape the inner periphery of the chamber, and has parts coming close to or even scraping the outer surface of the wall 65. The mechanism is so designed that it will permit the processing of material containing comparatively large solid ingredients, such as fruit, nuts, or the like, which are often used in ice creams.

The agitating mechanism is illustrated as including a header or annular plate 77 at the top of the chamber just beneath the stationary top wall or casing head 46 and connected to a hollow shaft 79 encircling the refrigerant return pipe. The shaft may be secured to the annular blade carrier or header 77 and the top wall 68 of the refrigerant chamber preferably has an extension 81 projecting into the lower inner end of the shaft 79 to guide the latter and provide a seal for the inner end of this shaft. The juxtaposed surfaces of the parts 81, 77 and 46 may be provided with sealing grooves to prevent the passage of material therebetween, and if desired, with roller bearings. Any suitable means may be provided for rotating the hollow shaft 79.

The annular plate 77 is connected to a ring 91 at the bottom by means of a series of blades 92 closely juxtaposed to or scraping upon the outer surface of the wall 65 so as to tend to force the material outwardly.

For insuring the proper intermixing, the blades and the outer wall of the mixing chamber 44 may be provided with fingers, prongs or projections in staggered or intermeshing relationship so that the prongs of the blades pass through between the prongs of the casing and have a cutting or wiping action, but permitting solid pieces of fruit, nuts or the like to pass therethrough. Some but only a small percentage of lumps will be broken up or subdivided. The prongs may be arranged to wipe past or be closely spaced if margarin, lard or the like is being treated, and in which it is desirable to destroy all lumps.

As shown particularly in Fig. 6 the blades are provided with outwardly extending projections or fingers 93, and the wall of the chamber is provided with inwardly extending projections or fingers 94. The number of rows of fingers on the chamber wall is preferably different from the number of blades 92 so that any strain resulting from forcing one set of projections between another will occur at only one point at any one time, and thus the torque on the driving motor will be more uniformly distributed. The projections instead of being rigidly mounted on the blades may be hinged thereto or may be flexible so that they may give rather than break in passing through the interdental spaces on the other blades. The blades themselves may have the projections rigid therewith, but may be pivotally or yieldably connected to the upper or lower members to permit them to move should they encounter solid pieces of fruit or nuts which could not otherwise readily pass through.

As previously noted the B unit may take the product from a plurality of A units and may be of such capacity that the movement through the B unit will be very much slower than through the A unit. During this movement through the B unit the material is thoroughly agitated and mulled while at the same time kept at a low temperature to prevent the kick up or rise in temperature which results from the crystallization following the rapid superchilling in the A unit.

As indicated in Fig. 1 the nuts, fruit or air may be introduced between A and B units so that the B unit mixes these in without the necessity for passing them through the A unit, and the refrigerant in the B unit prevents any rise in temperature from the addition of these warmer ingredients.

By means of the improved process and apparatus hereinabove described, the uniformity of the product may be kept within extremely narrow limits, a smooth texture is maintained during further crystallization, additional ingredients of gaseous or solid form may be incorporated after the initial chilling or partial freezing, and when the material has sufficient body or stiffness to retain the added ingredients distributed throughout the mass.

The material may flow at a rapid rate and in a thin layer in the A unit and at a much slower rate in a thicker layer in the B unit.

Various other advantages will be apparent from a consideration of the specific constructions illustrated, as well as from a commercial operation of them.

In the use of my invention for the processing of materials in which it is desirable that the product be sealed from exposure to atmospheric air, the pipe 49 may be connected to a filling device which extends to the bottom of the packing or packaging unit or container and which will follow the level in the unit or container as said level rises or otherwise varies, for instance, as shown in the Vogt and Wymond Patent 1,881,106, granted Oct. 4, 1932. The unit or container may be initially filled with an inert gas or be disposed in a chamber filled with such gas.

Having thus described my invention, what I claim as new and desire to secure by Letters Patent is:

1. The process of treating material, including positively forcing a continuous stream thereof through a processing chamber, refrigerating the material while passing therethrough, agitating the material during its passage, thereafter passing the material through a second processing chamber at a slower rate, and applying sufficient refrigeration to the second chamber to limit rise in temperature during crystal formation therein.

2. The process of treating material, including positively forcing a continuous stream thereof in a comparatively thin layer through a processing chamber having a refrigerated surface, agitating the material during its passage, passing said material in a thicker layer through a second processing chamber having a refrigerated surface, and agitating the material in said second chamber.

3. The process of treating material, which includes positively forcing a plurality of streams of the material through separate processing chambers in parallel, refrigerating the material in each chamber while passing therethrough, agitating the material during said passage, bringing said streams together, passing a stream of the combined materials through a further processing chamber, further refrigerating the material in said last mentioned chamber, and agitating the material in said last chamber to homogenize the materials from said first mentioned separate chambers.

4. The process of treating material to change the condition thereof, which includes causing the material to flow in a comparatively thin confined layer, rapidly and mechanically agitating the material during such flow, refrigerating the material during said flow, thereafter causing the material to flow at a lower speed in a thicker confined layer, mechanically agitating the material during said last mentioned flow, and simultaneously preventing substantial rise in temperature.

5. The process of refrigerating material to effect rapid crystallization of at least a portion thereof, which includes causing the material to flow in a comparatively thin confined layer over a heat transfer surface, subjecting said surface to the action of a refrigerating medium, rapidly and mechanically agitating the material during such flow, causing said material to flow in a thicker confined layer over a second heat transfer surface, subjecting said last mentioned surface to the action of a refrigerating medium, and agitating the material during the last mentioned flow.

6. The process of treating material to change its condition, including causing the material to flow in a comparatively thin confined layer over a heat transfer surface, mechanically agitating and refrigerating the material during such flow, thereafter adding a second material, causing the material to flow in a thicker confined layer over a second heat transfer surface, and agitating and refrigerating the material during the last mentioned flow.

7. The process of treating shortening to cause rapid solidification thereof and to impart a light color thereto, which includes causing the shortening in liquid form to flow over a refrigerated surface sealed from exposure to the atmosphere, and thereafter adding thereto and mixing therewith a predetermined proportion of a substantially moisture free gas.

8. The process of treating shortening to cause rapid solidification thereof and to impart a light color thereto, which includes causing the shortening in liquid form to flow over a refrigerated surface sealed from exposure to the atmosphere, thereafter adding thereto and mixing therewith a predetermined proportion of a substantially moisture free gas, and refrigerating and agitating said mixture.

9. The process of treating shortening to effect solidification thereof, which includes causing the material to flow in a continuous stream, refrigerating the material along a portion of the path of the stream and adding an inert gas to the stream at a point beyond said portion.

10. An apparatus for treating material, including a plurality of processing chambers, means for positively forcing a continuous stream thereof through one of said chambers, means for refrigerating the material while passing therethrough, means for mechanically agitating the material during its passage, means for thereafter passing the material through another of said chambers at a slower rate, and means for applying sufficient refrigeration to the second mentioned chamber to prevent rise in temperature during crystal formation therein.

11. An apparatus for treating material, including a pair of chambers having separate refrigerated surfaces, the ratio of refrigerated surface to volume in the first chamber being greater than in the second chamber, means for positively forcing a continuous stream of the material through said chambers in succession, and means for agitating the material in each of said chambers.

12. An apparatus for treating material, including a plurality of separate processing chambers connected in parallel, means for refrigerating the material in each chamber, means for agitating the material in each chamber, a further processing chamber, means for bringing together the material from all of said first mentioned chambers and delivering the same to said last mentioned chamber, means for thoroughly mixing the materials from the first mentioned chambers in said second mentioned chamber, and means for refrigerating the material in said last mentioned chamber.

13. An apparatus for refrigerating a material to effect rapid crystallization of at least a portion thereof, which includes means for causing the material to flow in a comparatively thin confined layer, means for subjecting said material in said layer to the action of a refrigerating medium, means for rapidly and mechanically agitating the material during such flow, means for causing said material to flow in a thicker confined layer, means for subjecting said material in said thicker layer to the action of a refrigerating medium, means for agitating the material in said last mentioned layer, and means for refrigerating said last mentioned layer to prevent rise in temperature during said last mentioned agitation.

14. An apparatus for treating material to change its condition, including a chamber having spaced walls to form a comparatively thin passage, means for forcing the material through said passage, means for refrigerating one wall of said passage, an agitator in said passage, means for adding a second material to the material leaving said passage, a second chamber having spaced walls to form a thicker passage, means for forcing the material and added ingredient through said second passage, means for refrigerating one wall of said second passage, and an agitator in said second passage.

15. An apparatus for treating material to change its condition, including a chamber having spaced walls to form a comparatively thin passage, means for forcing the material through said passage, means for refrigerating one wall of said passage, means for adding a second material to the material leaving said passage, a second chamber having spaced walls to form a thicker passage, means for forcing the material and added ingredient through said second passage, and means for refrigerating one wall of said second passage.

16. An apparatus for treating material to change its condition, including a chamber having spaced walls to form a comparatively thin passage, means for forcing the material through said passage, means for refrigerating one wall of said passage, an agitator in said passage, means for injecting a gas in the material leaving said passage, a second chamber having spaced walls to form a passage, means for forcing the material and added gas through said second passage, means for refrigerating one wall of said second passage, and an agitator in said second passage.

17. An apparatus for treating material to change its condition, which includes a heat transfer surface, means for refrigerating the same, means for causing the material to flow over said surface, a mechanical agitator adjacent to said surface, a proportioning pump for adding a further ingredient in predetermined relative proportion, and means for mixing said material and added ingredient.

18. An apparatus for treating material to change its condition, which includes a heat transfer surface, means for causing the material to flow over said surface, a mechanical agitator adjacent to said surface, a proportioning pump for adding a further ingredient in predetermined relative proportion, a second heat transfer surface, means for causing the material and added ingredient to flow over said second transfer surface, means for agitating the material and added ingredient during said last mentioned flow, and means for refrigerating both of said surfaces.

19. An apparatus for treating material to change the condition thereof, including a chamber adapted to receive the material to be treated, a vessel disposed therein and adapted to contain a refrigerating medium and forming therewith an annular space, an agitating member within said space, a hollow shaft for rotating said agitating member, and a conduit extending through said shaft for delivering refrigerant to said vessel.

CLARENCE W. VOGT.

DISCLAIMER 2,063,066.—*Clarence W. Vogt*, Louisville, Ky. METHOD AND APPARATUS FOR PROCESSING MATERIAL. Patent dated December 8, 1936. Disclaimer filed April 30, 1938, by the assignee, *The Girdler Corporation*.

Hereby enters this disclaimer to claim 19 in said specification.

[*Official Gazette May 24, 1938.*]

means for causing the material to flow over said surface, a mechanical agitator adjacent to said surface, a proportioning pump for adding a further ingredient in predetermined relative proportion, and means for mixing said material and added ingredient.

18. An apparatus for treating material to change its condition, which includes a heat transfer surface, means for causing the material to flow over said surface, a mechanical agitator adjacent to said surface, a proportioning pump for adding a further ingredient in predetermined relative proportion, a second heat transfer surface, means for causing the material and added ingredient to flow over said second transfer surface, means for agitating the material and added ingredient during said last mentioned flow, and means for refrigerating both of said surfaces.

19. An apparatus for treating material to change the condition thereof, including a chamber adapted to receive the material to be treated, a vessel disposed therein and adapted to contain a refrigerating medium and forming therewith an annular space, an agitating member within said space, a hollow shaft for rotating said agitating member, and a conduit extending through said shaft for delivering refrigerant to said vessel.

CLARENCE W. VOGT.

DISCLAIMER 2,063,066.—*Clarence W. Vogt*, Louisville, Ky. METHOD AND APPARATUS FOR PROCESSING MATERIAL. Patent dated December 8, 1936. Disclaimer filed April 30, 1938, by the assignee, *The Girdler Corporation*.

Hereby enters this disclaimer to claim 19 in said specification.

[*Official Gazette May 24, 1938.*]

DISCLAIMER 2,063,066.—*Clarence W. Vogt*, Louisville, Ky. METHOD AND APPARATUS FOR PROCESSING MATERIAL. Patent dated December 8, 1936. Disclaimer filed April 30, 1938, by the assignee, *The Girdler Corporation*.

Hereby enters this disclaimer to claim 19 in said specification.

[*Official Gazette May 24, 1938.*]